(12) United States Patent
Ko

(10) Patent No.: US 9,354,634 B2
(45) Date of Patent: May 31, 2016

(54) AUTOMATIC HOMING AND CHARGING METHOD FOR SELF-MOVING CLEANING APPARATUS

(71) Applicant: Joseph Y. Ko, Laguna Niguel, CA (US)

(72) Inventor: Joseph Y. Ko, Laguna Niguel, CA (US)

( * ) Notice: Subject to any disclaimer, the term of this patent is extended or adjusted under 35 U.S.C. 154(b) by 94 days.

(21) Appl. No.: 14/482,385

(22) Filed: Sep. 10, 2014

(65) Prior Publication Data

US 2016/0070268 A1     Mar. 10, 2016

(51) Int. Cl.
*G05D 1/02* (2006.01)
*B60L 11/18* (2006.01)
*A47L 11/40* (2006.01)

(52) U.S. Cl.
CPC .......... *G05D 1/0225* (2013.01); *A47L 11/4011* (2013.01); *B60L 11/1816* (2013.01)

(58) Field of Classification Search
USPC ................ 701/22, 414; 901/1, 25, 46, 47; 700/245, 253; 15/3
See application file for complete search history.

(56) References Cited

U.S. PATENT DOCUMENTS

| 2005/0010330 A1* | 1/2005 | Abramson | G05D 1/0225 D1/225 |
| 2014/0100693 A1* | 4/2014 | Fong | G05D 1/0274 700/253 |

FOREIGN PATENT DOCUMENTS

TW           M453295          5/2013

* cited by examiner

*Primary Examiner* — Adam Tissot

(57) ABSTRACT

An automatic homing and charging method for a self-moving cleaning apparatus mainly includes the steps of: judging power of the self-moving cleaning apparatus lower than an intended charging power value; controlling the self-moving cleaning apparatus to move forward until bumping against an obstacle; controlling the self-moving cleaning apparatus to turn a swerved angle; controlling the self-moving cleaning apparatus to move straightly for a preset distance; controlling the self-moving cleaning apparatus to move along an arched locus until bumping against the obstacle again; and detecting a position signal issued from a charging dock and controlling the self-moving cleaning apparatus to turn and move forward to form electric contact with the charging dock. The invention also provides a debugging mechanism to avoid circuiting round the obstacle, thus can accurately search the charging dock.

10 Claims, 12 Drawing Sheets

AUTOMATIC HOMING AND CHARGING METHOD FOR SELF-MOVING CLEANING APPARATUS

FIELD OF THE INVENTION

The present invention relates to an automatic homing and charging method for self-moving cleaning apparatus and particularly to an automatic homing and charging method to make a self-moving cleaning apparatus to automatically search a charge dock.

BACKGROUND OF THE INVENTION

With advance of technology now automatic cleaning apparatus capable of providing automatic dust suction function has been developed and marketed. It no longer needs people to drag and control the position of dust suction port to do suction of dust. It can move by itself and automatically perform dust suction at the same time to substitute manpower to do cleaning task. Once the automatic cleaning apparatus is started by users it can automatically perform dust suction action in a space where cleaning is intended. This greatly increases the convenience of the users in doing the cleaning task. In addition, after the automatic cleaning apparatus has performed automatic dust suction operation for a period of time it can automatically return to a charging station for charging before the power is depleted.

For instance, Taiwan patent No. M453295 discloses an automatic guiding charging apparatus for robotic cleaning machines. It includes a charging dock that requires at least three signal emission lamps, with swerved moving signal emission lamps at two sides to form an inverse V shape. However, the inverse V-shaped angle requires precise adjustment. Too small of the angle could cause signal overlap and result in the cleaning machine unable to enter the charging dock location. Too big of the angle makes entering the charging dock location inaccurate and difficult. Moreover, the cleaning machine has only one receiver at the front end that has a limited receiving angle, generally less than 120 degrees. As a result, when the cleaning machine moves in a direction slightly outwards at a small angle it cannot capture the signal emitted from the charging dock, and moves away from the charging dock without getting normal charge. Moreover, the cleaning machine also has metal electrode plates at the front end for charging. In the event that the cleaning machine bumps against furniture or other articles the metal electrode plates could be easily contaminated and result in poor contact for charging.

SUMMARY OF THE INVENTION

The primary object of the present invention is to resolve the problem of the conventional robotic cleaning machines of unable to do accurate searching of charging dock.

To achieve the foregoing object the present invention provides an automatic homing and charging method for self-moving cleaning apparatus. The method includes the steps as follows: step 1: judge, through an intended charging power value preset in a microcontroller located in a self-moving cleaning apparatus, the power of a battery included in the self-moving cleaning apparatus being lower than the intended charging power value, and detect regularly a position signal sent from a charging dock through a first signal receiver located at a lateral side of the self-moving cleaning apparatus; step 2: the microcontroller outputs a first straight moving signal to drive a drive unit included in the self-moving cleaning apparatus to make the self-moving cleaning apparatus to move straightly and bump against at least one obstacle; step 3: the microcontroller outputs a first turning signal to drive the drive unit to make the self-moving cleaning apparatus to turn a swerved angle to make the first signal receiver to face the obstacle, and the microcontroller saves the swerved angle as a swerved moving data; step 4: the microcontroller outputs a second straight moving signal to drive the drive unit to make the self-moving cleaning apparatus to move straightly for a preset distance; step 5: the microcontroller outputs a moving signal to drive the drive unit to make the self-moving cleaning apparatus move along an arched locus so that the self-moving cleaning apparatus bumps against the obstacle again, and the microcontroller generates a moving time data based on the moving time in which the arched locus was generated by the self-moving cleaning apparatus and the obstacle is bumped, and an angle data is generated by processing the moving time data and a moving speed data preset in the microcontroller; step 6: judge that the first signal receiver has received the position signal sent by the charging dock, and the first signal receiver sends a position confirmation signal to the microcontroller; step 7: the microcontroller receives the position confirmation signal and sends a second turning signal to the drive unit to make the self-moving cleaning apparatus to generate self turning, and a second signal receiver included in the self-moving cleaning apparatus gets the position signal from the charging dock and sends a positioning signal to the microcontroller; step 8: the microcontroller receives the positioning signal and stops sending the second turning signal to the drive unit to make the self-moving cleaning apparatus to stop self-rotation, and makes a charging portion included in the self-moving cleaning apparatus to face the charging dock; and step 9: the microcontroller outputs a third straight moving signal to drive the drive unit to make the self-moving cleaning apparatus to move toward the charging dock, and make the charging portion electrical in contact with the charging dock to charge the battery.

In one embodiment of the invention the step 4 further includes a sub-step in which the self-moving cleaning apparatus bumps against another obstacle during moving to redo execution of the step 3.

In another embodiment of the invention the step 3 further includes a sub-step to make the microcontroller to accumulate time from the microcontroller outputting the first turning signal and save as a search time data.

In yet another embodiment of the invention the step 5 further includes a sub-step of judging the search time data matching a time judgment condition preset in the microcontroller, and the microcontroller sending a four turning signal to the drive unit to make the self-moving cleaning apparatus to turn a second leaving angle, and redoing execution of the step 2.

In yet another embodiment of the invention the step 5 further includes a sub-step of making the microcontroller to generate a route data by processing based on the swerved moving data and the angle data, and judging the route data matching a debugging judgment condition preset in the microcontroller, and the microcontroller sending a third turning signal to the drive unit to make the self-moving cleaning apparatus to turn a first leaving angle, and redoing execution of the step 2.

In yet another embodiment of the invention the debugging judgment condition is that the sum of the swerved angle included in the swerved moving data and the angle included in the angle data is greater than 540 degrees.

In yet another embodiment of the invention the step 1 further includes a sub-step of using a virtual wall generating device to projecting at least one optical signal generated by at least one virtual wall generating device toward a cleaning zone to form a confined cleaning zone to confine the self-moving cleaning apparatus from continuously moving forward.

In yet another embodiment of the invention the self-moving cleaning apparatus includes a third signal receiver which detects the optical signal and sends a warning signal to the microcontroller to make the self-moving cleaning apparatus to move away from the confined cleaning zone, the virtual wall generating device including a plurality of light generators to project the optical signal upon electrically energized and a power module to supply power to the light generators.

In yet another embodiment of the invention the step 1 further includes a sub-step to make the microcontroller to output a stop signal to a cleaning unit included in the self-moving cleaning apparatus to shut down the cleaning unit.

In yet another embodiment of the invention the step 9 further includes a sub-step to make the microcontroller to judge whether the charging portion is in contact with the charging dock within a first detection time preset in the microcontroller starting from the third straight moving signal output from the microcontroller, and redo execution of the step 2 through the step 9 in the event that the first detection time is over and the charging portion is not contacting with the charging dock.

The invention, by means of the method set forth above, compared with the conventional structures, provides a feature as follow:

1. The automatic homing and charging method of the invention can make the self-moving cleaning apparatus to precisely search the charging dock to get charging.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
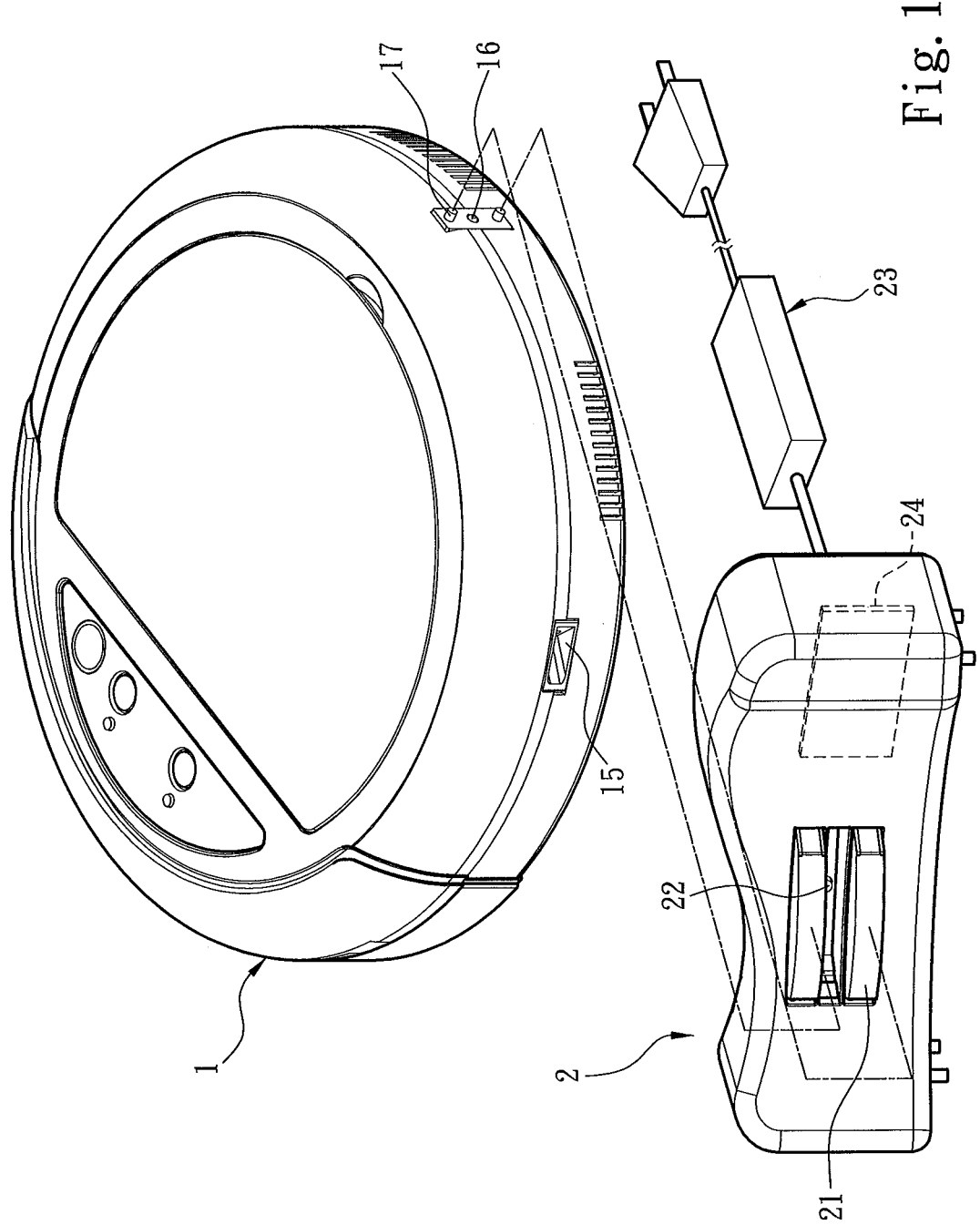
FIG. 1 is a schematic structural view of the self-moving cleaning apparatus and the charging dock of the invention.
Figure 2:
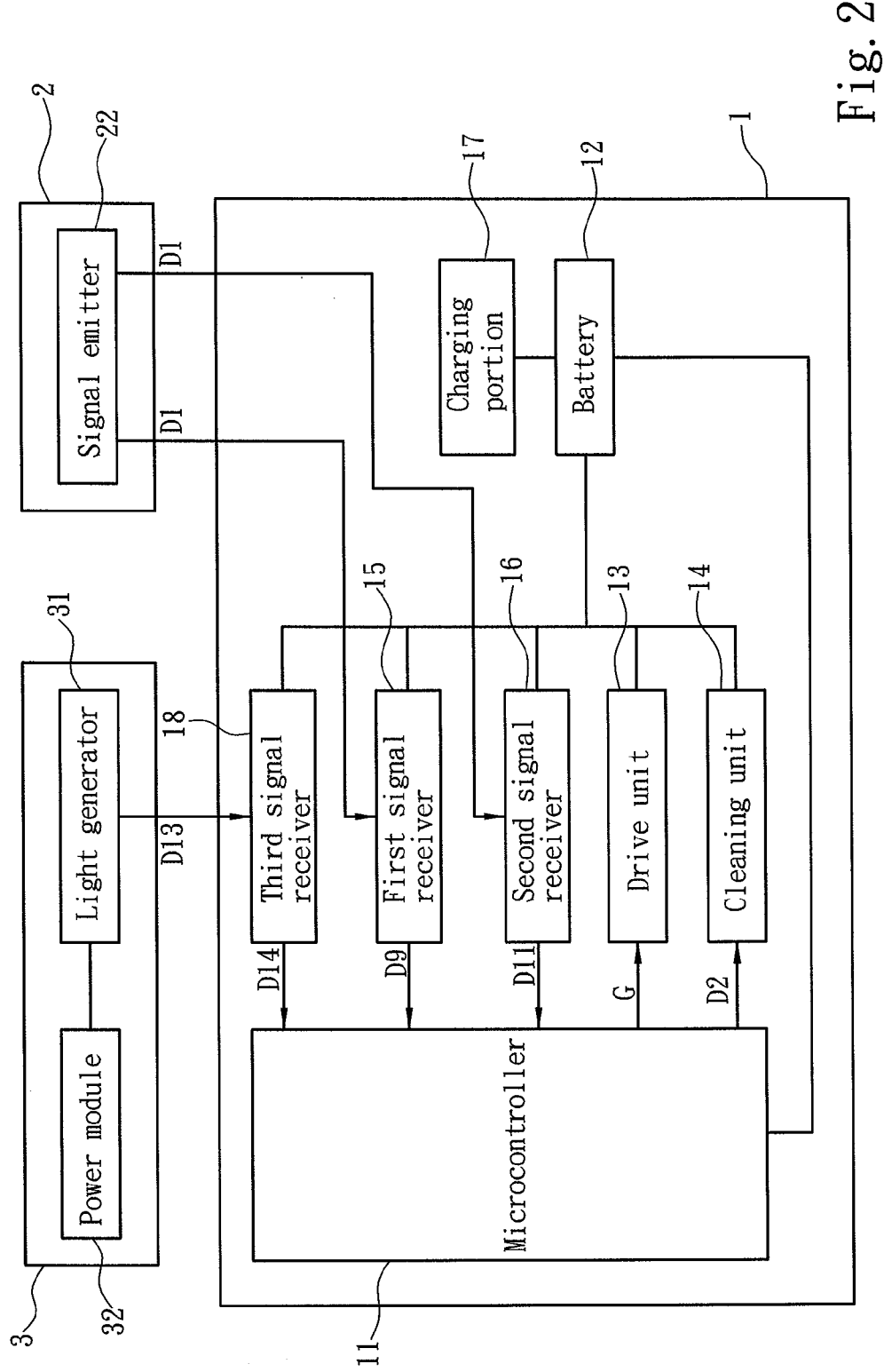
FIG. 2 is a system block diagram of the automatic homing and charging method for self-moving cleaning apparatus of the invention.
Figure 3A:
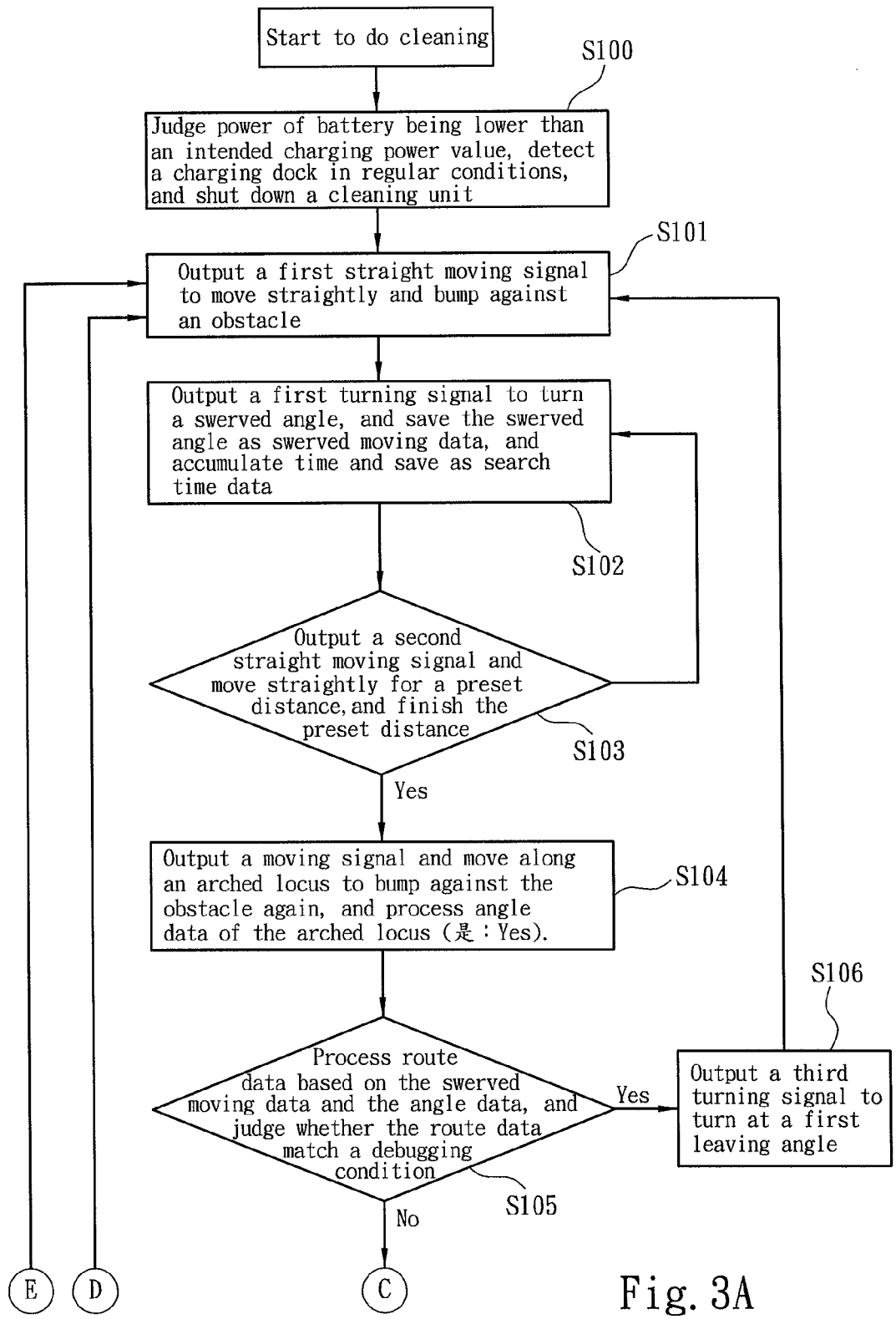
FIGS. 3A and 3B are flowcharts of the automatic homing and charging method for self-moving cleaning apparatus of the invention.
Figure 3B:
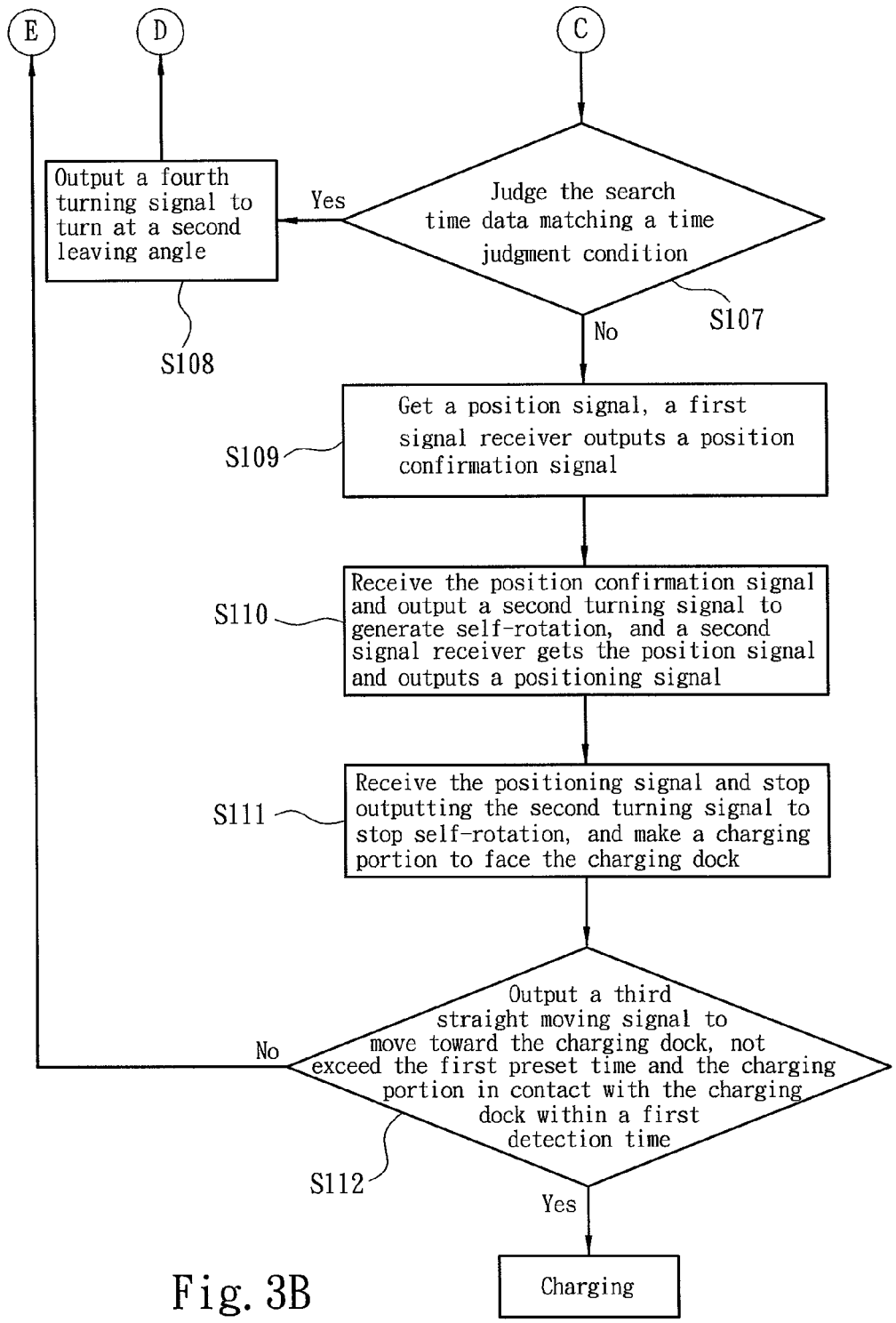

Please referring to FIGS. 1 and 2, the present invention aims to provide an automatic homing and charging method for self-moving cleaning apparatus to enable a self-moving cleaning apparatus 1 to automatically search a charging dock 2 for charging. First, regarding the design of the charging dock 2, it mainly includes a charging element 21, a signal emitter 22, a power transmission unit 23 and a circuit board 24. The signal emitter 22 is located on the circuit board 24 between the charging element 21. The circuit board 24 is electrically connected to the charging element 21, the signal emitter 22 and the power transmission unit 23. The power transmission unit 23 sends received power to the charging element 21 and the signal emitter 22. Furthermore, the power transmission unit 23 can be connected to city power that supplies AC power, and transform the AC power to DC power. Hence the charging element 21 can directly provide the DC power to the self-moving cleaning apparatus 1. In addition, the signal emitter 22 can emit a signal to allow the self-moving cleaning apparatus 1 to do detection to search the correct position of the charging dock 2.

Please referring to FIGS. 1 and 2 again, regarding the design of the self-moving cleaning apparatus 1, it mainly includes a microcontroller 11, a battery 12, a drive unit 13, a cleaning unit 14, a first signal receiver 15, a second signal receiver 16 and a charging portion 17. The drive unit 13 can include a servo motor and a drive wheel set driven by the servo motor. The cleaning unit 14 can be selectively a dust suction motor to generate dust suction power, a cleaning broom for sweeping or a mop for mopping floor. Since the drive unit 13 and the cleaning unit 14 are commonly known and can be implemented easily by those skilled in the art, details are omitted herein. Moreover, the microcontroller 11, the drive unit 13, the cleaning unit 14, the first signal receiver 15 and the second signal receiver 16 are electrically connected to the battery 12 to receive electric power. The charging portion 17 also is electrically connected to the battery 12 and electrically connected to the charging element 21 of the charging dock 2 to transmit electric power to the battery 12. Regarding the function of the microcontroller 11, it can preset an intended charging power value and judge whether the power of the battery 12 is lower than the intended charging power value. In the event that the microcontroller 11 detects that the power of the battery 12 is lower than the intended charging power the self-moving cleaning apparatus 1 needs to search the charging dock 2 for charging. In the event that the power of the battery 12 is not lower than the intended charging power the self-moving cleaning apparatus 1 can continuously operate according to user's setting. Moreover, the microcontroller 11 also is electrically connected to the drive unit 13 and the cleaning unit 14, and can output signals to drive the drive unit 13 and the cleaning unit 14 to move and perform cleaning function respectively. In addition, the microcontroller 11 also is electrically connected to the first signal receiver 15 and the second signal receiver 16. The first signal receiver 15 is located at a lateral side of the self-moving cleaning apparatus 1, and the second signal receiver 16 is located at a rear side of the self-moving cleaning apparatus 1 in the charging portion 17. the first signal receiver 15 and the second signal receiver 16 aim to detect the signal emitter 22 of the charging dock 2, and send a feedback signal to the microcontroller 11 to confirm that the charging dock 2 is found.

In order to simplify signal labeling in FIG. 2, all the signals sent from the microcontroller 11 to the drive unit 13 are holistically clustered in a signal group G as shown in FIG. 2. The signal group G includes a first straight moving signal D3, a first turning signal D4, a second straight moving signal D5, a moving signal D6, a third turning signal D7, a fourth turning signal D8, a second turning signal D10 and a third straight moving signal D12.

Please referring to FIGS. 3A through 5G, after the self-moving cleaning apparatus 1 is started, it operates according to user's setting to do cleaning task. The automatic homing and charging method of the invention, first proceeds step S100: the microcontroller 11 judges whether the power of the battery 12 is lower than the intended charging power value, and also detects through the first signal receiver 15 in regular conditions a position signal D1 issued from the signal emitter 22 of the charging dock 2. In addition, the microcontroller 11 outputs a stop signal D2 to the cleaning unit 14 to shut down the cleaning unit 14.

Next, proceeds step S101: the microcontroller 11 outputs a first straight moving signal D3 to drive the drive unit 13 to make the self-moving cleaning apparatus 1 to move in a straight manner to bump against at least one obstacle P1. As the charging dock 2 generally is connected to a receptacle which is commonly mounted onto a wall, hence the step S101 aims to make the self-moving cleaning apparatus 1 to find out the obstacle P1 first, then move slowly along the obstacle P1 to search the charging dock 2, as shown in FIG. 4.

Figure 4:
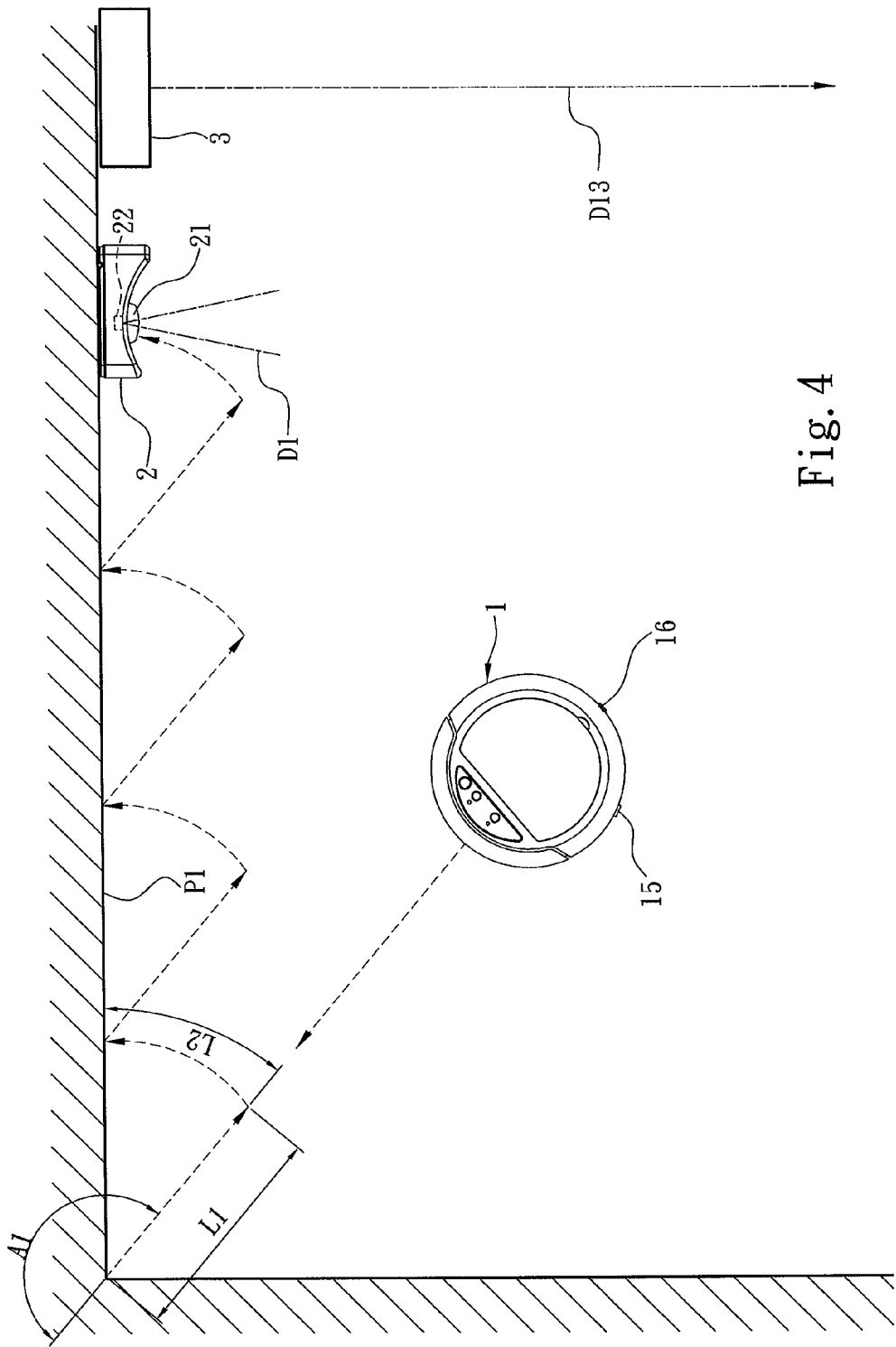
FIG. 4 is schematic view-1 of moving loci of the self-moving cleaning apparatus of the invention.

Next, proceeds step S102: the microcontroller 11 outputs a first turning signal D4 to drive the drive unit 13 to make the self-moving cleaning apparatus 1 to turn a swerved angle A1 and make the first signal receiver 15 to face the obstacle P1, then the microcontroller 11 saves the swerved angle A1 as a swerved moving data as shown in FIG. 4. In this embodiment the swerved angle A1 is preset in the microcontroller 11 and can be set at varying angles. In addition, when the self-moving cleaning apparatus 1 has turned at the swerved angle A1 but cannot move forward, it continuously turns the swerved angle A1 until not being hindered. Or, when the self-moving cleaning apparatus 1 has turned the swerved angle A1 but cannot move forward, it moves backward for a selected distance, then continuously turns the swerved angle A1 and moves forward until not being hindered. It is to be noted that the microcontroller 11 accumulates all the turned swerved angles A1 and saves as the swerved moving data. Furthermore, the microcontroller 11, based on sending of the first turning signal D4 as beginning, accumulates time and saves it as a search time data.

Next, proceeds step S103: the microcontroller 11 outputs a second straight moving signal D5 to drive the drive unit 13 to make the self-moving cleaning apparatus 1 to move straightly for a preset distance L1. In the event that the self-moving cleaning apparatus 1 bumps against another obstacle (not shown in the drawings) before finishing the moving distance L1, redoes execution of the step S102. In addition, in the even that the self-moving cleaning apparatus 1 does not bump against the another obstacle before finishing the moving distance L1, continues the next step.

Next, proceeds step S104: the microcontroller 11 outputs a moving signal D6 to drive the drive unit 13 to move along an arched locus L2 to make the self-moving cleaning apparatus 1 to bump against the obstacle P1 again as shown in FIG. 4. In addition, the microcontroller 11, based on a moving time data generated by the self-moving cleaning apparatus 1 while moving along the arched locus to bump against the obstacle P1, generates a moving time data which is processed with a moving speed data preset in the microcontroller 1 to generate an angle data. In other words, the angular speed of the self-moving cleaning apparatus 1 is the moving speed data, and the moving time is the moving time data. Hence by multiplying the angular speed of the self-moving cleaning apparatus 1 and the moving time the angle size of the arched locus L2 moved by the self-moving cleaning apparatus 1 can be processed and obtained. The size of the angle is the angle data.

It is to be noted that, the steps S102, S103 and S104 aim to make the self-moving cleaning apparatus 1 to move continuously along the obstacle P1 without moving far away from it, and continuously search the charging dock 2, as shown in FIG. 4.

Next, proceeds step S105: the microcontroller 11 generates a route data based on the swerved moving data and the angle data, and judges whether the route data matching the debugging judgment condition preset in the microcontroller 11. In this embodiment the microcontroller 11 saves the swerved angle A1 in a negative value, and saves the angle included in the angle data in a positive value. For instance, if the swerved angle A1 of the self-moving cleaning apparatus 1 is turning 80 degrees, it becomes −80 degrees. If the angle included in the angle data of the self-moving cleaning apparatus 1 is 50 degrees, it becomes +50 degrees. Meanwhile, if the swerved angle A1 and the angle included the angle data are added together, the result is −30 degrees which becomes the route data obtained by processing. The route data and the debugging judgment conditions previously discussed aim to prevent the self-moving cleaning apparatus 1 from continuously circuiting round a single obstacle P2. Since a general room has tables and chairs inside, to prevent the self-moving cleaning apparatus 1 from continuously circuiting round the tables and the chairs, a debugging mechanism must be designed to make the self-moving cleaning apparatus 1 to search the charging dock 2 connected to the receptacle along the wall (i.e. the obstacle P1) as shown in FIG. 5. In this embodiment, the debugging judgment condition is making the sum of the swerved angle included in the swerved moving data and the angle included in the angle data greater 540 degrees. Hence in the event that the self-moving cleaning apparatus 1 turns about a single obstacle P2 at an angle greater than 540 degrees, i.e., one and a half round, the self-moving cleaning apparatus 1 moves away from the obstacle P2. However, the invention is not limited to debugging judgment condition mentioned above.

Figure 5A:
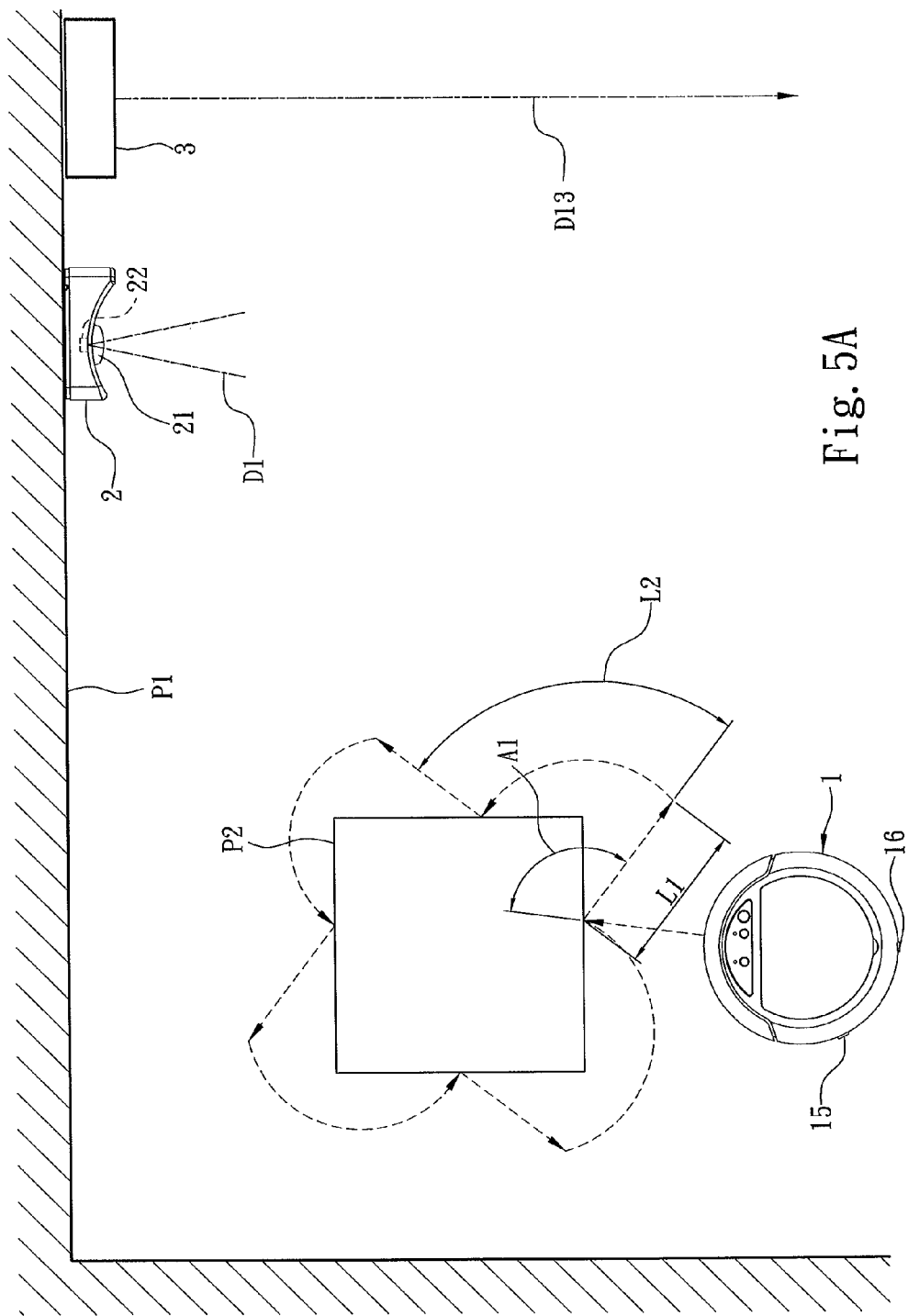
FIG. 5A is schematic view-2 of moving loci of the self-moving cleaning apparatus of the invention.
Figure 5B:
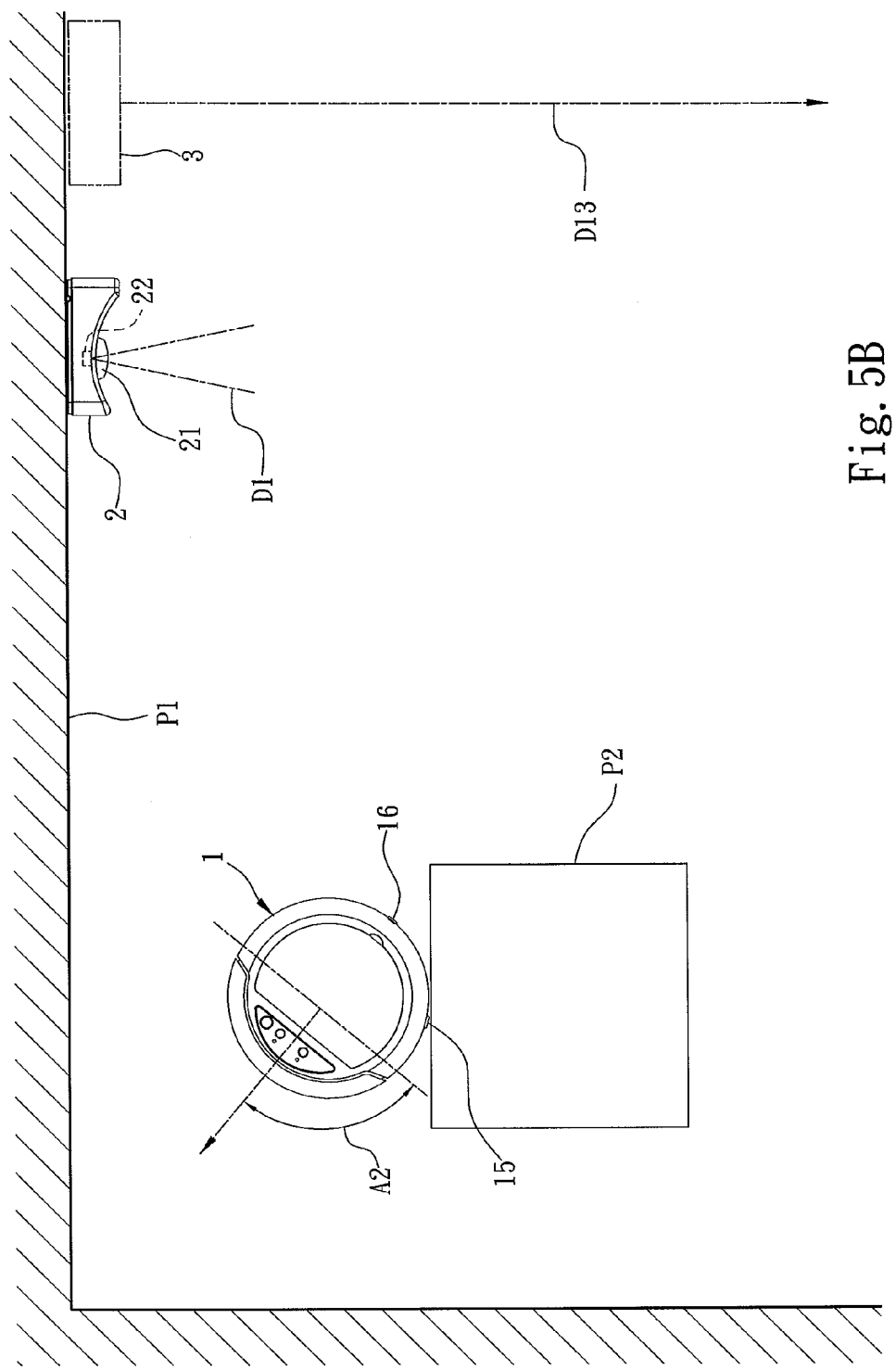
FIG. 5B is schematic view-3 of moving loci of the self-moving cleaning apparatus of the invention.
Figure 5C:
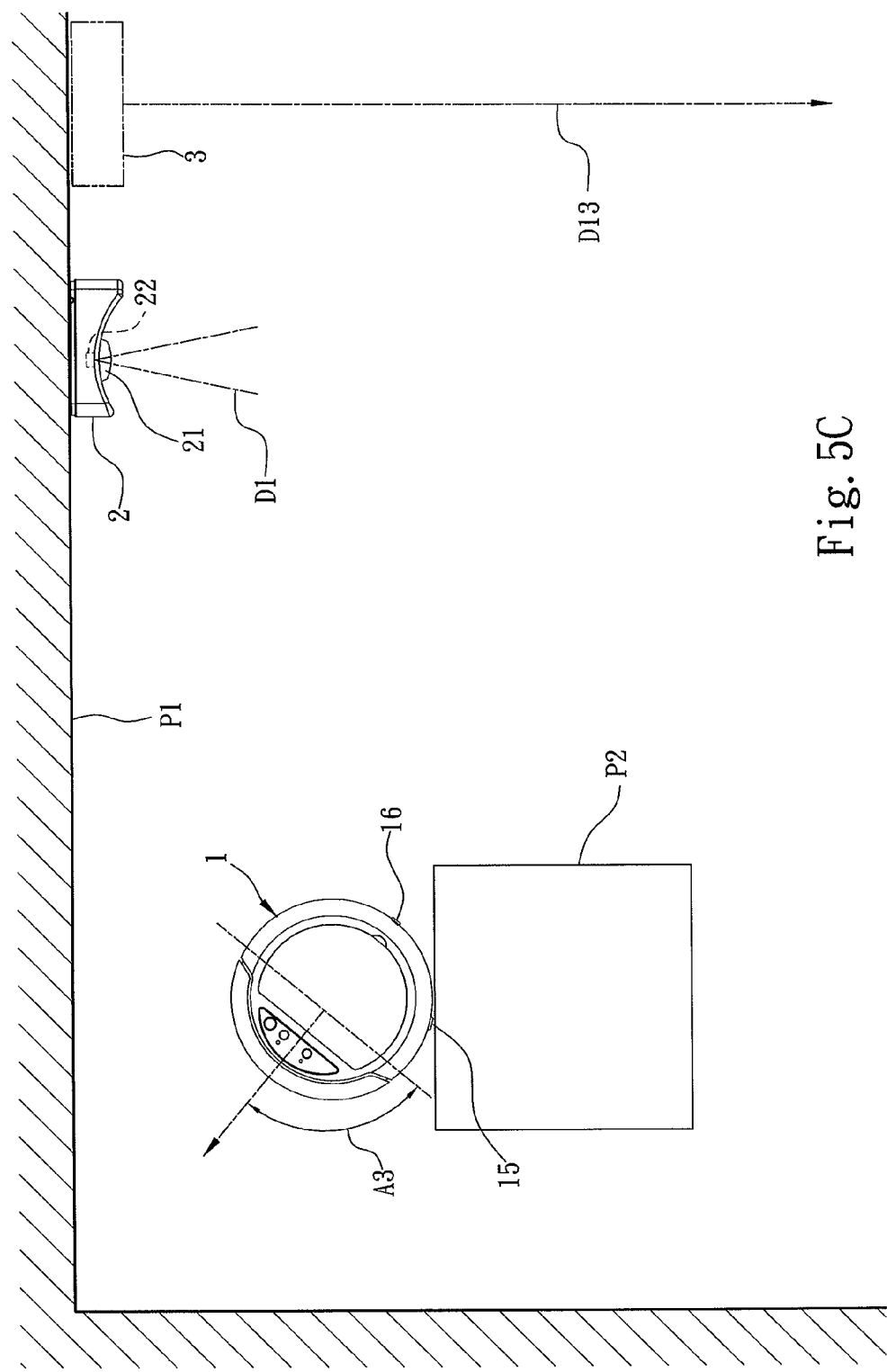
FIG. 5C is schematic view-4 of moving loci of the self-moving cleaning apparatus of the invention.
Figure 5D:
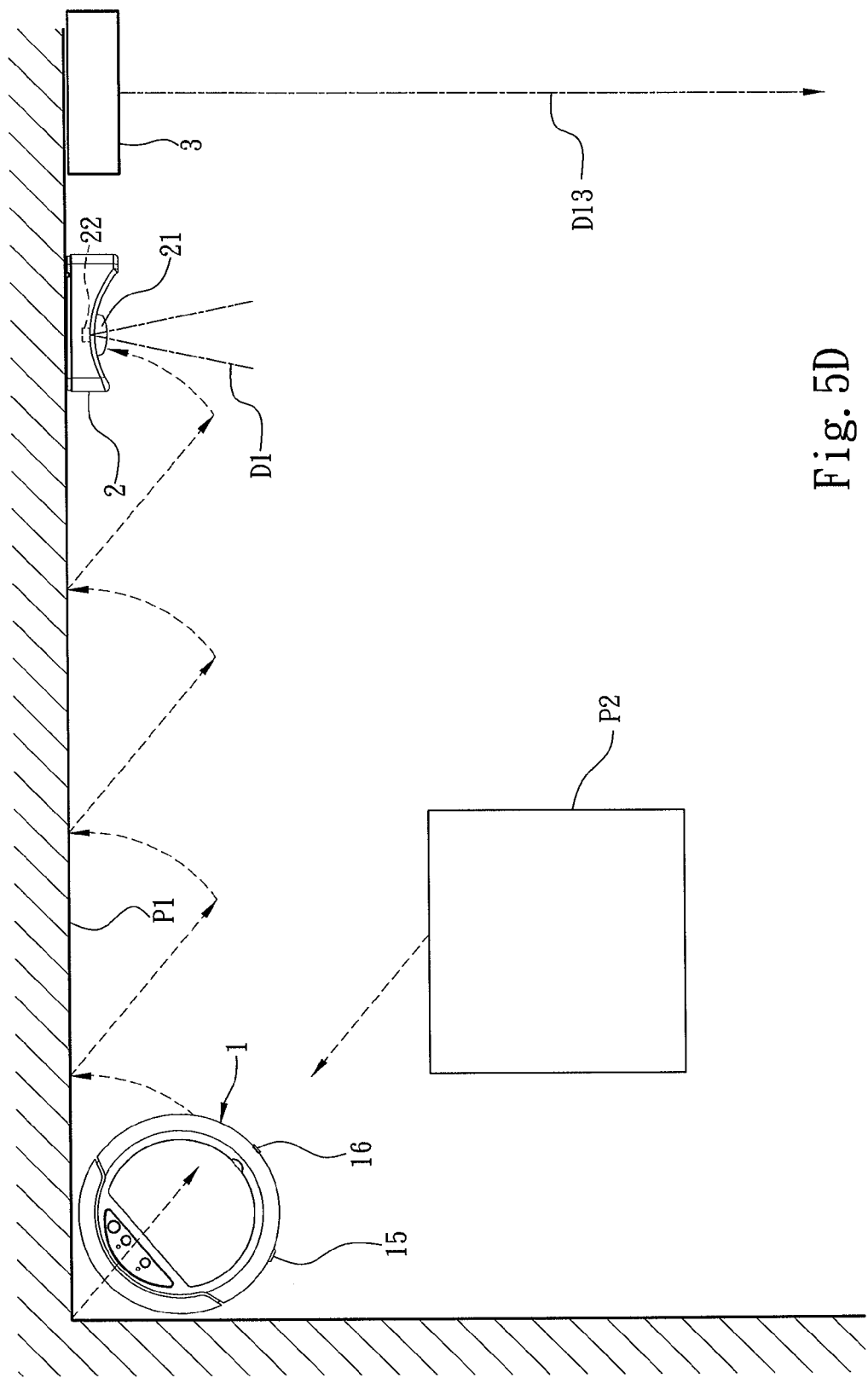
FIG. 5D is schematic view-5 of moving loci of the self-moving cleaning apparatus of the invention.

In addition, in the event that the route data matches the debugging judgment condition, proceeds step S106: the microcontroller 11 outputs a third turning signal D7 to the drive unit 13 to make the self-moving cleaning apparatus 1 to turn a first leaving angle A2, and redoes execution of the step S101, and move away from the obstacle P2 as shown in FIGS. 5B and 5D. Turning the first leaving angle A2 aims to prevent the self-moving cleaning apparatus 1 from circuiting round erroneously the obstacle P2 without detecting the position signal D1 of the charging dock 2. Hence it must turn away from the obstacle P2. In the event that the route data does not match the debugging judgment condition, proceeds the next step.

Next, proceeds step S107: the microcontroller 11 includes a preset a time judgment condition, and judges whether the search time data matches the time judgment condition.

Furthermore, in the event that the microcontroller 11 judges that the search time data matches the time judgment condition, proceeds step S108: the microcontroller 11 outputs a four turning signal D8 to the drive unit 13 to make the self-moving cleaning apparatus 1 to turn a second leaving angle A3, and the microcontroller 11 redoes execution of the step S101, and the self-moving cleaning apparatus 1 leave the obstacle P2 as shown in FIGS. 5C and 5D. The object of turning the second leaving angle A3 is same as that of the first leaving angle A2, hence details are omitted herein. In the event that the microcontroller 11 judges that the search time data does not match the time judgment condition, continues the next step.

Figure 5E:
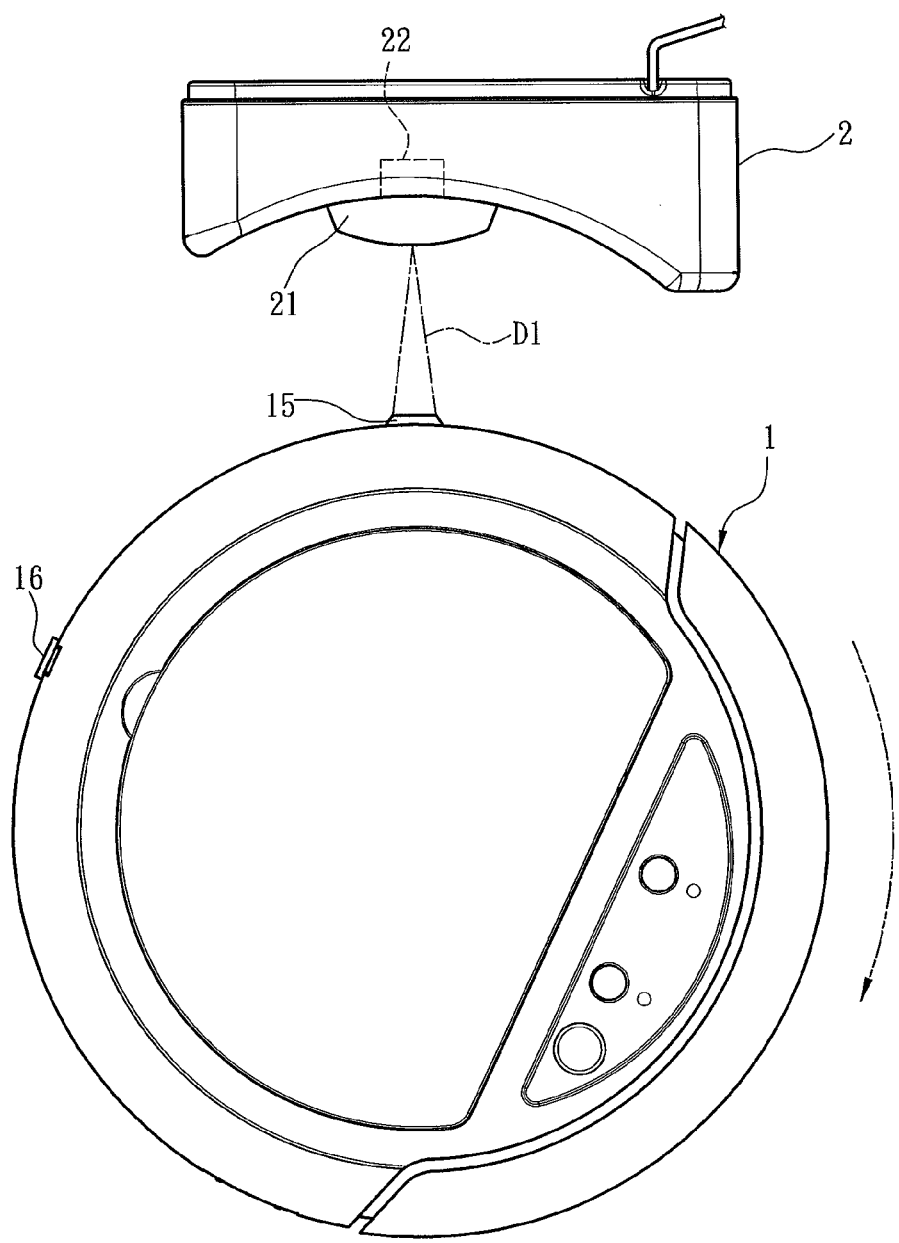
FIG. 5E is schematic view-6 of moving loci of the self-moving cleaning apparatus of the invention.

Next, proceeds step S109: the first signal receiver 15 gets the position signal D1 issued by the charging dock 2, then outputs a position confirmation signal D9 to the microcontroller 11 as shown in FIG. 5E.

It is to be noted that in the event that the first signal receiver 15 does not yet receive the position signal D1 from the charging dock 2, the self-moving cleaning apparatus 1 repeats execution of the step S101 through step S108 until getting the position signal D1 from the charging dock 2.

Figure 5F:
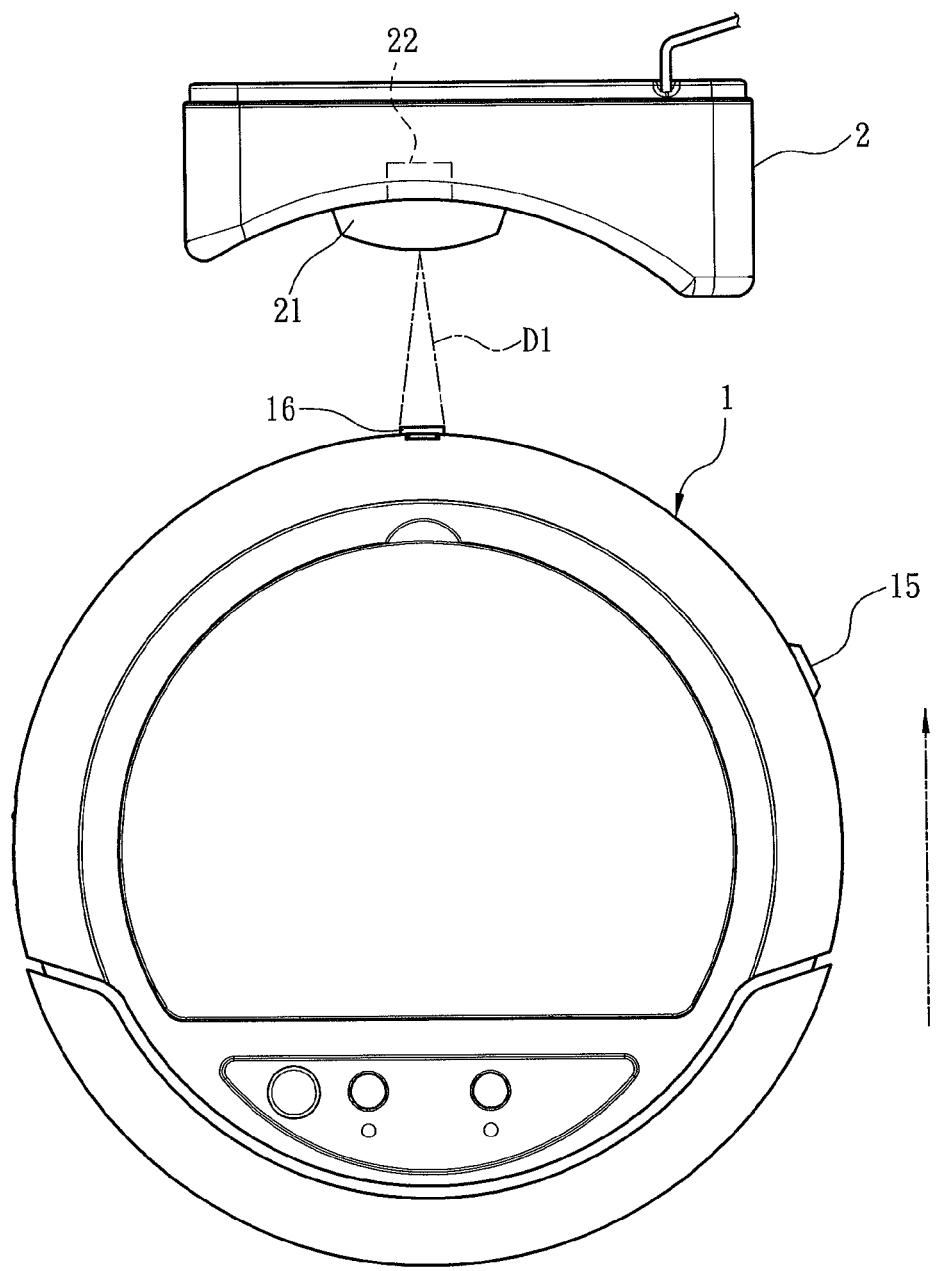
FIG. 5F is schematic view-7 of moving loci of the self-moving cleaning apparatus of the invention.

Next, proceeds step S110: after the microcontroller 11 has received the position confirmation signal D9, it outputs a second turning signal D10 to the drive unit 13 to make the self-moving cleaning apparatus 1 to generate self-rotation to allow the second signal receiver 16 to get the position signal D1 from the charging dock 2 and also output a positioning signal D11 to the microcontroller 11 as shown in FIG. 5F.

Next, proceeds step S111: the microcontroller 11 receives the positioning signal D11 and stops sending the second turning signal D10 to the drive unit 13 to make the self-moving cleaning apparatus 1 to stop self-rotation, and make the charging portion 17 of the self-moving cleaning apparatus 1 to face the charging dock 2 as shown in FIG. 5F.

Figure 5G:
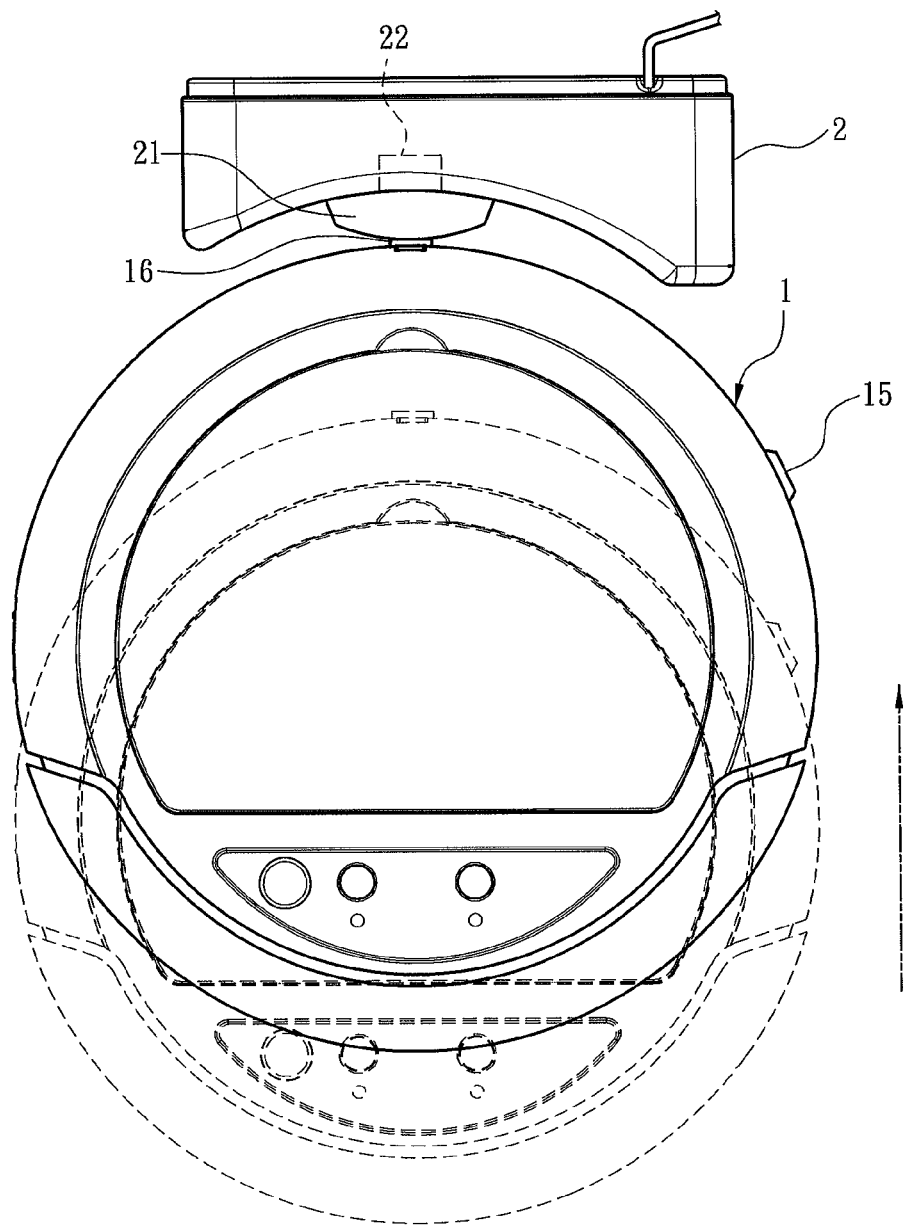
FIG. 5G is schematic view-8 of moving loci of the self-moving cleaning apparatus of the invention.

Next, proceeds step S112: the microcontroller 11 outputs a third straight moving signal D12 to drive the drive unit 13 to make the self-moving cleaning apparatus 1 to move toward the charging dock 2 so that the charging portion 17 is in electrical contact with the charging element 21 of the charging dock 2 to charge the battery 12 as shown in FIG. 5G. In addition, starting from the microcontroller 11 sending the third straight moving signal D12, the microcontroller 11 judges, based on a first detection time preset therein, whether the charging portion 17 is in contact with the charging element 21 of the charging dock 2 within the first detection time. If the first detection time is over and the charging portion 17 is not yet in contact with the charging element 21, the charging dock 2 transmits power to the charging portion 17 to charge the battery 12.

Also refer to FIGS. 2 and 3 again for another embodiment of the invention, in which the step S100 further includes projecting at least one optical signal D13 through at least one virtual wall generating device 3 to a cleaning zone to form a moving range to confine the self-moving cleaning apparatus 1. The self-moving cleaning apparatus 1 includes a third signal receiver 18 to detect the optical signal D13 and outputs a warning signal D14 to the microcontroller 11 to make the self-moving cleaning apparatus 1 to move away from the virtual wall generating device 3. Since the virtual wall generating device 3 is commonly known by those skilled in the art, details about how the third signal receiver 18 detects and judges the optical signal D13 are omitted herein. The virtual wall generating device 3 includes at least one light generator 31 to project the optical signal D13 upon energized by electricity and a power module 32 to supply electric power to the light generator 31. Thus, user can merely put the virtual wall generator 3 in place to form a surrounding zone to make the self-moving cleaning apparatus 1 to do cleaning and moving activities as shown in FIGS. 4 through 5D.

In short, the automatic horning and charging method for self-moving cleaning apparatus according to the invention mainly includes judging the electric power of a self-moving cleaning apparatus being lower than an intended charge power value; controlling the self-moving cleaning apparatus to move forward until bumping against an obstacle; controlling the self-moving cleaning apparatus to turn a swerved angle to move away from the obstacle; controlling the self-moving cleaning apparatus to move straightly for a preset distance; controlling the self-moving cleaning apparatus to move along an arched locus toward the obstacle until bumping against thereof; detecting a position signal issued from a charging dock; and controlling the self-moving cleaning apparatus to turn and move forward to form electric contact with the charging dock to do charging. In addition, the automatic horning and charging method of the invention further includes a debugging mechanism to prevent the self-moving cleaning apparatus from circuiting round the obstacle. Thus, the automatic homing and charging method of the invention enables the self-moving cleaning apparatus to accurately search the charging dock to do charging.

What is claimed is:

1. An automatic horning and charging method for a self-moving cleaning apparatus, comprising the steps of:
    step 1: judging electric power of a battery of the self-moving cleaning apparatus being lower than an intended charging power value preset in a microcontroller of the self-moving cleaning apparatus, and detecting in regular conditions a position signal issued from a charging dock by a first signal receiver located at a lateral side of the self-moving cleaning apparatus;
    step 2: outputting a first straight moving signal by the microcontroller to drive a drive unit of the self-moving cleaning apparatus to make the self-moving cleaning apparatus to move straightly to bump against at least one obstacle;
    step 3: outputting a first turning signal by the microcontroller to drive the drive unit to make the self-moving cleaning apparatus to turn a swerved angle to make the first signal receiver to face the obstacle, and saving the swerved angle by the microcontroller as a swerved moving data;
    step 4: outputting a second straight moving signal by the microcontroller to drive the drive unit to make the self-moving cleaning apparatus to move straightly for a preset distance;
    step 5: outputting a moving signal by the microcontroller to drive the drive unit to make the self-moving cleaning apparatus to move along an arched locus so that the self-moving cleaning apparatus bumps against the obstacle again, and generating a moving time data by the microcontroller based on moving time of the self-moving cleaning apparatus when moves along the arched locus, and generating an angle data by using the microcontroller to process the moving time data and a moving speed data preset in the microcontroller;
    step 6: judging the position signal issued from the charging dock being received by the first signal receiver, and sending a position confirmation signal by the first signal receiver to the microcontroller;
    step 7: outputting a second turning signal to the drive unit by the microcontroller upon receiving the position confirmation signal to make the self-moving cleaning apparatus to generate self-rotation, and making a second signal receiver of the self-moving cleaning apparatus to get the position signal issued by the charging dock and send a positioning signal to the microcontroller;
    step 8: stopping sending of the second turning signal to the drive unit by the microcontroller upon receiving the positioning signal to make the self-moving cleaning apparatus to stop self-rotation, and making a charging portion of the self-moving cleaning apparatus to face the charging dock; and
    step 9: outputting a third straight moving signal by the microcontroller to drive the drive unit to make the self-moving cleaning apparatus to move toward the charging dock so that the charging portion forms electrical contact with the charging dock to charge the battery.

2. The automatic homing and charging method for a self-moving cleaning apparatus of claim 1, wherein the step 4 further includes a sub-step of executing the step 3 anew upon the self-moving cleaning apparatus being in contact with another obstacle during the moving.

3. The automatic homing and charging method for a self-moving cleaning apparatus of claim 1, wherein the step 3 further includes a sub-step of making the microcontroller to accumulate time from the microcontroller outputting the first turning signal and save the time as a search time data.

4. The automatic homing and charging method for a self-moving cleaning apparatus of claim 3, wherein the step 5 is followed by a sub-step of judging the search time data matching a time judgment condition preset in the microcontroller, and outputting a four turning signal by the microcontroller to the drive unit to make the self-moving cleaning apparatus to turn a second leaving angle and execute the step 2 again.

5. The automatic homing and charging method for a self-moving cleaning apparatus of claim 1, wherein the step 5 further is followed by a sub-step of making the microcontroller to generate a route data by processing the swerved moving data and the angle data, and judging the route data matching a debugging judgment condition preset in the microcontroller, and outputting a third turning signal by the microcontroller to the drive unit to make the self-moving cleaning apparatus to turn a first leaving angle and execute the step 2 again.

6. The automatic homing and charging method for a self-moving cleaning apparatus of claim 5, wherein the debugging judgment condition is the sum of the swerved angle included in the swerved moving data and angle included in the angle data being greater than 540.degrees.

7. The automatic homing and charging method for a self-moving cleaning apparatus of claim 1, wherein the step 1 further includes a sub-step of using a virtual wall generating device to project at least one optical signal toward a cleaning zone to form a confined cleaning zone to confine the self-moving cleaning apparatus from moving forward continuously.

8. The automatic homing and charging method for a self-moving cleaning apparatus of claim 7, wherein the self-moving cleaning apparatus includes a third signal receiver to detect the optical signal and send a warning signal to the microcontroller to make the self-moving cleaning apparatus to move away from the confined cleaning zone, the virtual wall generating device including a plurality of light generators to project the optical signal upon energized by electricity and a power module to supply electric power to the light generators.

9. The automatic horning and charging method for a self-moving cleaning apparatus of claim 1, wherein the step 1 further includes a sub-step of making the microcontroller to output a stop signal to a cleaning unit of the self-moving cleaning apparatus to shut down the cleaning unit.

10. The automatic homing and charging method for a self-moving cleaning apparatus of claim 1, wherein the step 9 further includes a sub-step of judging by the microcontroller whether the charging portion is in contact with the charging dock within a first detection time preset in the microcontroller starting from the microcontroller outputting the third straight moving signal, and executing the step 2 through the step 9 in the event that the first detection time is over and the charging portion is not contacting with the charging dock.

\* \* \* \* \*